United States Patent
Jun et al.

(10) Patent No.: US 7,522,527 B2
(45) Date of Patent: Apr. 21, 2009

(54) SCALABLE CROSSBAR MATRIX SWITCH AND ARBITRATION METHOD THEREOF

(75) Inventors: Jong-Arm Jun, Daejeon (KR);
Sung-Hyuk Byun, Daejeon (KR);
Byung-Jun Ahn, Daejeon (KR);
Seung-Yeob Nam, Daejeon (KR);
Dan-Keun Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 957 days.

(21) Appl. No.: 10/663,476

(22) Filed: Sep. 15, 2003

(65) Prior Publication Data

US 2004/0120337 A1 Jun. 24, 2004

(30) Foreign Application Priority Data

Dec. 24, 2002 (KR) .................. 10-2002-0083720
Mar. 3, 2003 (KR) .................. 10-2003-0013079

(51) Int. Cl.
*G01R 31/08* (2006.01)
*H04L 12/28* (2006.01)
*H04L 12/56* (2006.01)

(52) U.S. Cl. ................... 370/236; 370/414
(58) Field of Classification Search .......... 370/388, 370/413, 414, 417, 418, 236
See application file for complete search history.

(56) References Cited

U.S. PATENT DOCUMENTS

| | | | |
|---|---|---|---|
| 5,299,190 A | 3/1994 | LaMaire et al. | |
| 5,500,858 A | 3/1996 | McKeown | |
| 5,801,657 A * | 9/1998 | Fowler et al. | 341/155 |
| 6,212,182 B1 * | 4/2001 | McKeown | 370/390 |
| 6,351,466 B1 | 2/2002 | Prabhakar et al. | |
| 6,667,984 B1 * | 12/2003 | Chao et al. | 370/414 |
| 7,170,903 B2 * | 1/2007 | Alasti et al. | 370/414 |
| 2001/0007563 A1 * | 7/2001 | Hachinota | 370/416 |
| 2002/0150121 A1 * | 10/2002 | Van Wageningen et al. | 370/462 |
| 2003/0007498 A1 * | 1/2003 | Angle et al. | 370/414 |
| 2003/0123468 A1 * | 7/2003 | Nong | 370/412 |
| 2004/0083326 A1 * | 4/2004 | Wang et al. | 710/317 |
| 2004/0085967 A1 * | 5/2004 | Boduch et al. | 370/395.42 |

OTHER PUBLICATIONS

"The iSLIP scheduling algorithm for input-queued switches"☐☐McKeown, N.; ☐☐Networking, IEEE/ACM Transactions on☐☐vol. 7, Issue 2, Apr. 1999 pp. 188-201.*

(Continued)

*Primary Examiner*—Seema S Rao
*Assistant Examiner*—Xavier Szewai Wong
(74) *Attorney, Agent, or Firm*—Blakely, Sokoloff, Taylor & Zafman LLP (57) ABSTRACT

Disclosed is a configuration method and device for a two-dimensional expandable crossbar matrix switch for application to tera-level high-speed and large-capacity switches. The present invention includes N input ports, N output ports, and an N×N matrix switch for transmitting cells between the input and output ports. Each input port includes N VOQs which are sequentially combined by n VOQs to configure respective L VOQ groups. The L VOQ groups are connected to L XSUs through independent interface ports. Therefore, each input port can transmit a maximum of L cells to the matrix switch during one cell time slot.

10 Claims, 11 Drawing Sheets

OTHER PUBLICATIONS

Seung Yeob Nam and Dan Keun Sung, *Decomposed Crossbar Switches with Multiple Input and Output Buffers*, Dept. of EECS, KAIST, 373-1, Kusong-dong, Yusong-gu, Taejon, 305-701, Korea, 2001 IEEE, pp. 2661-2665.

Nick McKeown, *The iSLIP Scheduling Algorithm for Input-Queued Switches*, IEEE/ACM Transactions On Networking, vol. 7, No. 2, Apr. 1999, pp. 188-201.

APCC2002; "Two-Dimensional Crossbar Matrix Switch Architecture", J. Jun, et al, 7 pages.

* cited by examiner

Step 1 : Request

FIG.3B

Step 2 : Grant

SCALABLE CROSSBAR MATRIX SWITCH AND ARBITRATION METHOD THEREOF

CROSS REFERENCE TO RELATED APPLICATION

This application is based on Korea Patent Applications No. 2002-83720 filed on Dec. 24, 2002 and No. 2003-13079 filed on Mar. 3, 2003 in the Korean Intellectual Property Office, the content of which is incorporated herein by reference.

BACKGROUND OF THE INVENTION (a) Field of the Invention

The present invention relates to a high-speed and large volume crossbar switch and an arbitration method for sending cells through the switch. More specifically, the present invention relates to a method for connecting $L^2$-numbered n×n crossbar switches to configure an N×N switch when n is a divisor of N and L=N/n, a device for transmitting cells to an output port from an input port, and an arbitration method thereof.

(b) Description of the Related Art

Since it is required to send a maximum of N cells through a predetermined output port at a single time slot in the case of an N×N output-queued switch, the operation rate of the switch and a memory must be N times faster than an input line rate. The reason that the output-queued switch is not applied to high-speed switches even though it has 100% throughput for uniform traffic and excellent features in terms of QoS support, is mainly due to the above-noted speedup problem.

Since the operation rate of the switch and the memory is the same as the input line rate in the case of an input-queued switch, the input-queued switches are applied to most of the high-speed switches. However, the structure of the high-speed input-queued switch has a VOQ (virtual output queue) form for solving the head-of-line blocking problem in the case of an input port, and it generally has a crossbar form that is a non-blocking high-speed switch in the case of a switch. Various arbitration methods for solving the contention problem between the input and output ports in the input-queued switch, and providing 100% throughput, have recently been proposed.

Among the-above described algorithms are the PIM (parallel iterative matching) method (refer to U.S. Pat. No. 5,267,235), the 2DRR (Two-dimensional round robin matching) method (refer to U.S. Pat. No. 5,299,190), the iSLIP method (refer to U.S. Pat. No. 5,500,858), and the dual round robin matching method (refer to "Centralized contention resolution schemes for a large-capacity optical ATM switch" by H. J. Chao and J-S Park, Proc. IEEE ATM Workshop97, Fairfax, Va., pp.10-11, May 1998). The algorithms allow 100% throughput, but they are limited by arbitration time as the number of the input/output ports increases, and hence, it is not advantageous to apply them to the large-volume and high-speed switches.

For example, the most commercialized iSLIP method has been mainly applied to switches with less than 32 ports. Since a tera-level switch with a 2.5 Gbps port rate needs a 512×512 crossbar switch, it causes a fundamental problem in use of a single crossbar switch and the conventional arbitration method to thus configure the switch.

Expandable switching solutions proposed as huge switching solutions include a channel group switching solution on the distribution network basis (refer to U.S. Pat. No. 5,724,351), and a crossbar switching solution in the Clos network format (refer to "Low-cost scalable switching solutions for broadband networking: The Atlanta architecture and chipset" by F. M. Chiussi, J. G. Kneuer, and V. P. Kumar, IEEE Commun. Mag., pp.44-53, December 1997). The channel group switching method advantageously uses small-capacity group switches to configure a large-capacity switch, but if the number of input/output ports increase, it becomes very complicated to design a distribution network, and accordingly, it is difficult to configure a large-capacity switch.

In the case of the crossbar switch of the Clos network type, since a plurality of paths are provided between the input/output ports, a complex scheduling method for distributing the loads of traffic per path is required, and when the number of high-speed input/output ports increases, high-speed crossbar switches are proportionally needed, therefore, causing difficulties in configuring a large-capacity switch.

SUMMARY OF THE INVENTION

It is an advantage of the present invention to provide an expandable switch having a single path between input/output ports and being applicable to a high-speed and large-capacity switch, and a distributed arbitration method appropriate for the switch.

The single-path expandable switch according to an embodiment of the present invention connects small-capacity crossbar switch units to configure a large-capacity switch, and provides a method for supporting 100% throughput for uniform traffic with sufficient arbitration time margins in the case of the distributed arbitration method.

In one aspect of the present invention, a matrix switch comprises: an input port for splitting a plurality of virtual output queues (VOQs) into a plurality of VOQ groups, and inputting them; a plurality of crossbar switch units for independently arbitrating the input VOQ groups, and outputting cells; and a plurality of output ports for independently arbitrating the cells output from the crossbar switch units, and transmitting the cells to the output ports.

Part of the crossbar switch units form a plurality of switch modules, and the switch module further comprises a buffer for storing a predetermined cell in the output port of the crossbar switch unit.

In another aspect of the present invention, an arbitration method of a matrix switch including a plurality of input ports, a plurality of crossbar switch units, a buffer, and a plurality of output ports comprises: (a) a grant arbiter of the crossbar switch unit searching for request signals transmitted from the input ports, and selecting the first-requested input port; (b) determining whether a buffer of the output port corresponding to the grant arbiter can receive an additional cell; (c) transmitting a grant signal to the input port when the buffer can receive the cell; (d) an accept arbiter of the crossbar switch unit selecting the first-granted grant signal of the grant signals; and (e) the accept arbiter transmitting an accept signal to the output port corresponding to the selected grant signal.

The method further comprises: (e an output arbiter of the output port searching for the request signals transmitted from the crossbar switch unit to select the first-requested crossbar switch unit; and (g) the output arbiter transmitting an accept signal to the selected crossbar switch unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
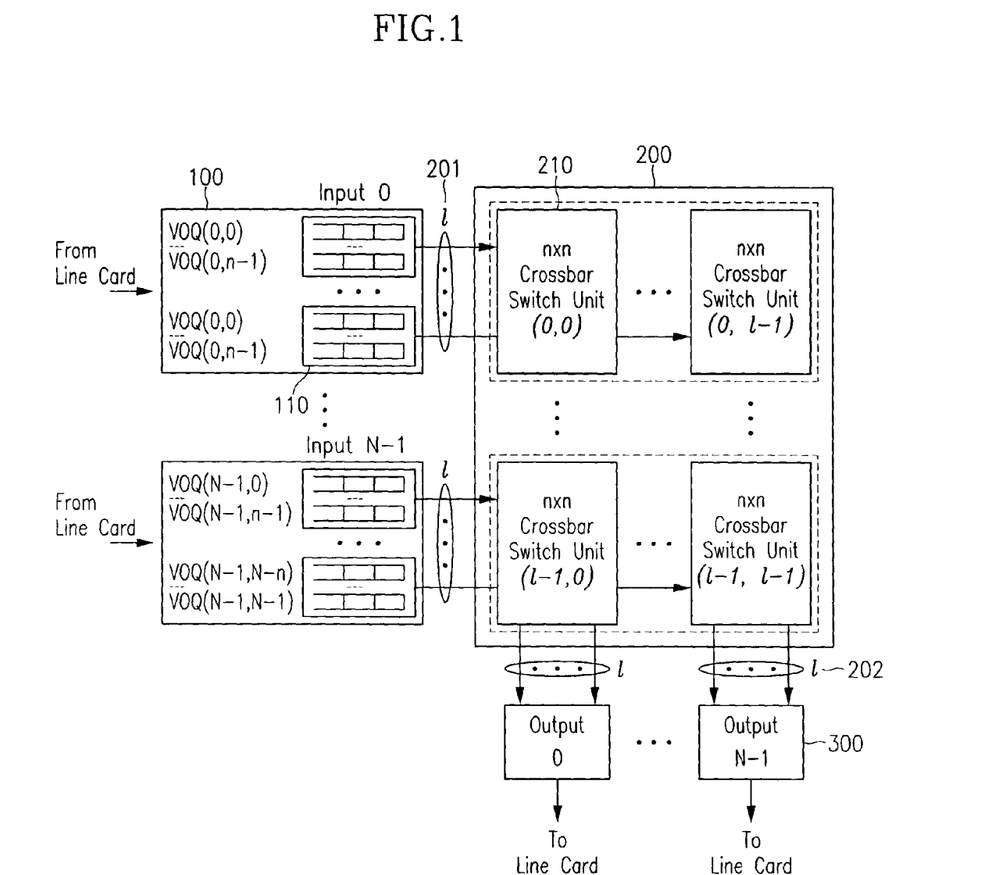
FIG. 1 shows a block diagram of an N×N crossbar matrix switch according to a preferred embodiment of the present invention.

FIG. 1 shows a block diagram of an N×N crossbar matrix switch according to a preferred embodiment of the present invention.

The present invention comprises N input ports 100, N output ports 300, and an N×N crossbar matrix switch 200 for transmitting cells between the input ports and the output ports.

Each input port 100 has N VOQs (virtual output queues) for solving the HOL (head-of-line) blocking problem. The N VOQs are sequentially combined by n VOQs into L VOQ groups 110 which are physically separated. In this instance, n is a divisor of N, and L=N/n. The L VOQ groups 110 are respectively connected through individual interface ports 201 to L XSUs (crossbar switch units) 210 which are physically separated. Therefore, each input port 100 can transmit a maximum of L cells to the matrix switch 200 for a single cell time slot.

The N×N matrix switch 200 comprises $L^2$ XSUs 210, each of which is connected to n respective input ports and n respective output ports. The XSU 210 transmits the cells, input from the n input ports 100, to the n output ports 300 through an independent arbitration function.

Each output port 300 is connected to the physically separated L XSUs 210 through L switch interface ports 202, and performs an individual arbitration task, and selects a single cell from the L XSUs 210 for a single cell time slot, and transmits the cell through an output link.

Figure 2:
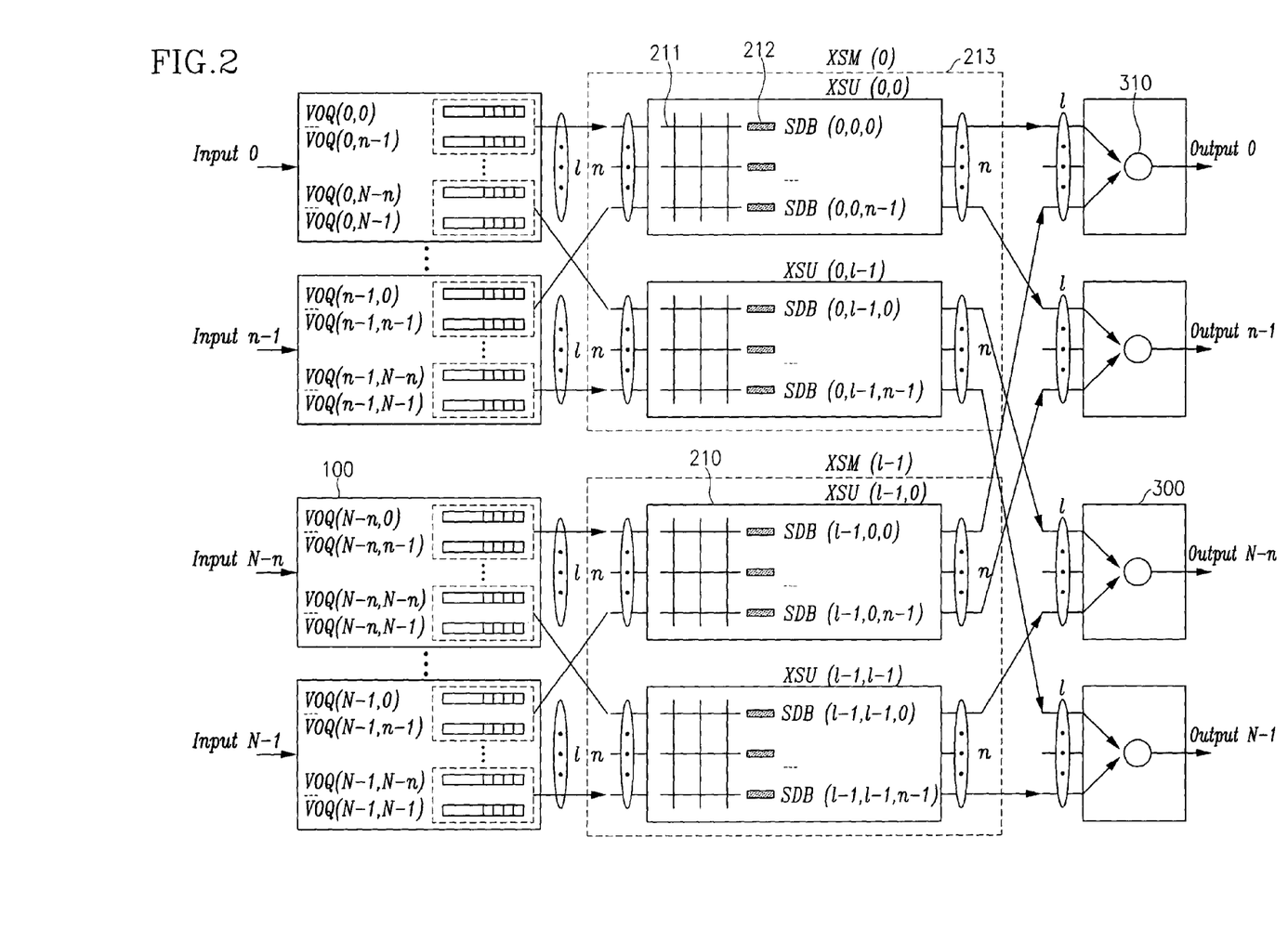
FIG. 2 shows an internal configuration of the N×N crossbar matrix switch according to a preferred embodiment of the present invention.

FIG. 2 shows an internal configuration of the N×N crossbar matrix switch according to a preferred embodiment of the present invention.

The XSU 210 comprises an n×n crossbar switch 211 having n input ports and n output ports, and SDBs (small-size scheduling decomposition buffers) 212 for storing a predetermined-sized cell in each output port.

The respective output port of the XSU 210 stores the cell in the corresponding SDB 212 through a respective arbitration function per output port of the XSU 210 when the SDB 212 is available to receive the cell. The arbitration method applied to the input ports and output ports of the XSU 210 can use various methods, and the most suitable method for high-speed realization from among them is the round robin method.

The round robin represents a method for selecting all components in a group in a reasonable order. In detail, in order to equitably assign resource-usage opportunities to processes, a predetermined time is assigned to each process, the process is temporarily suspended when the assigned time expires, an opportunity is provided to another process, another opportunity is given to the other process, etc., and thereby the opportunities are provided by turns.

An XSM (crossbar switch module) 213 comprises L XSUs 210, and receives cells from n input ports and transmits the cells to N output ports. The input ports connected to the m-th XSM range from the {m×n}-th input port to the {(m+1)×n−1}-th input port. A single XSM and n input ports can form a physically separated subsystem, and since a module feature for configuring a total N×N system by using the L subsystems is allowed, the large-capacity switch which is generally configured with multi-racks can advantageously be configured with modules.

The output port 300 includes logic element without using memories for storing the received cells, and an output arbiter 310 selects a single cell from the L SDBs 212 for a single time slot, and transmits the cell to the output port. The SDB matched with j-th output port is expressed as $$\sum_{m=0}^{l-1} SDB(m, \left\lfloor \frac{j}{n} \right\rfloor, j \bmod n).$$

Various methods can be applied to the output arbiter 310, and the most suitable method for high-speed realization thereof is the round-robin.

The arbitration between the inputs and outputs of the N×N crossbar matrix switch according to the preferred embodiment of the present invention has a two-stage distributed arbitration structure.

The first arbitration stage is executed by the respective distributed XSUs 210, and the second arbitration stage is executed by the respective distributed output ports. The respective arbitration stages perform the arbitration function independently with each other without internal speed-up, concurrently and frequently.

The first arbitration stage is a method achieved by expanding the iSLIP method. Each output port of the XSU 210 uses credit information (e.g., "1" represents a state the SDB cannot receive a cell, and "0" indicates a state the SDB can receive a cell) that is status information of the SDB 212 to execute the arbitration function. The arbitration operation of the XSU 210 includes a request, a grant, and an accept.

(1) Request: In each time slot, the VOQs that are not empty transmit "requests" to all the output ports.

(2) Grant: If a credit value is 0, each output port uses the round robin with the highest priority component as a start point to select a single request, and transmits a grant to the selected VOQ.

(3) Accept: When an input grant is obtained, the highest priority component is set as a start point, and the input accept is performed using the round robin.

The second arbitration stage is executed for each distributed output port, and its algorithm is based on the round robin described below.

(1) Request: In each time slot, the VOQs that are not empty transmit "requests" to all the output ports.

(2) Accept: Each output arbiter sets the highest priority component as a start point, and accepts a single request in the round robin.

Figure 8:
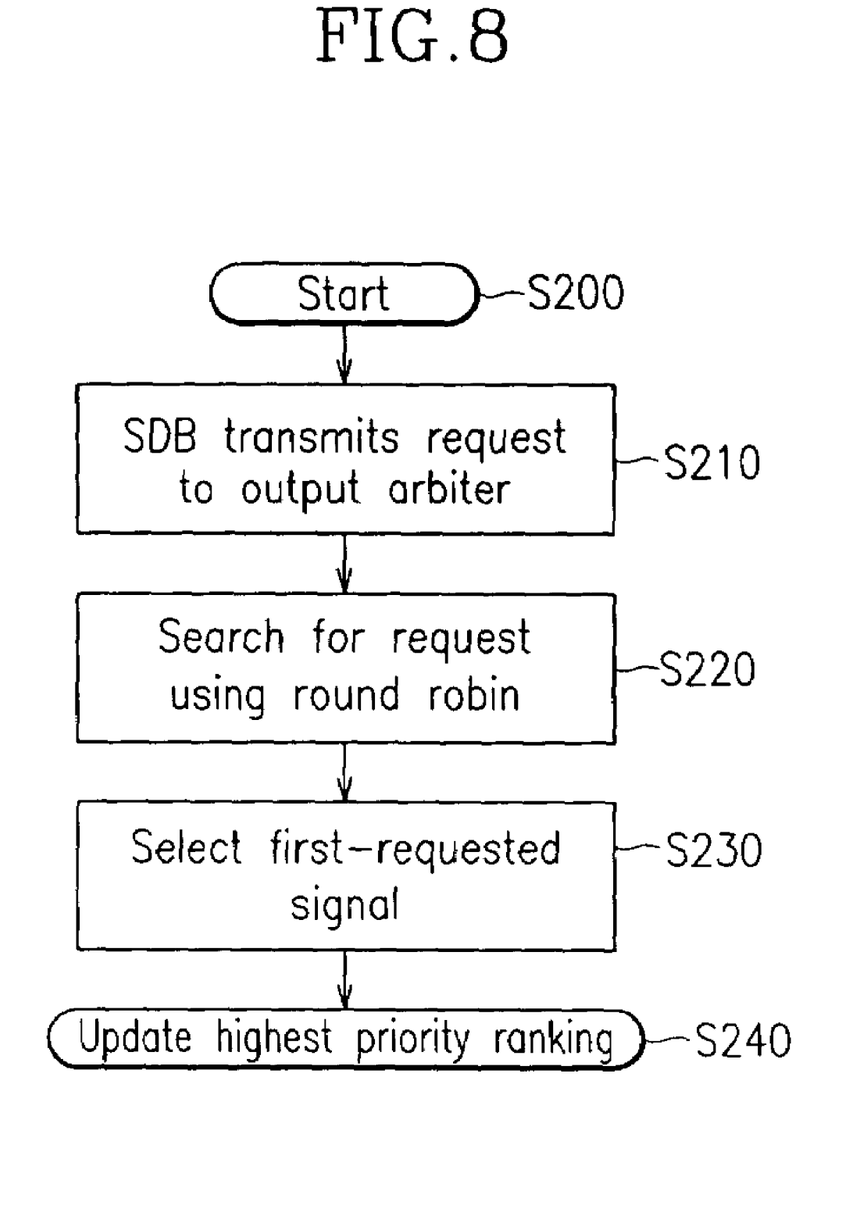
FIG. 8 shows a flowchart of a second arbitration step according to a preferred embodiment of the present invention.
Figure 9:
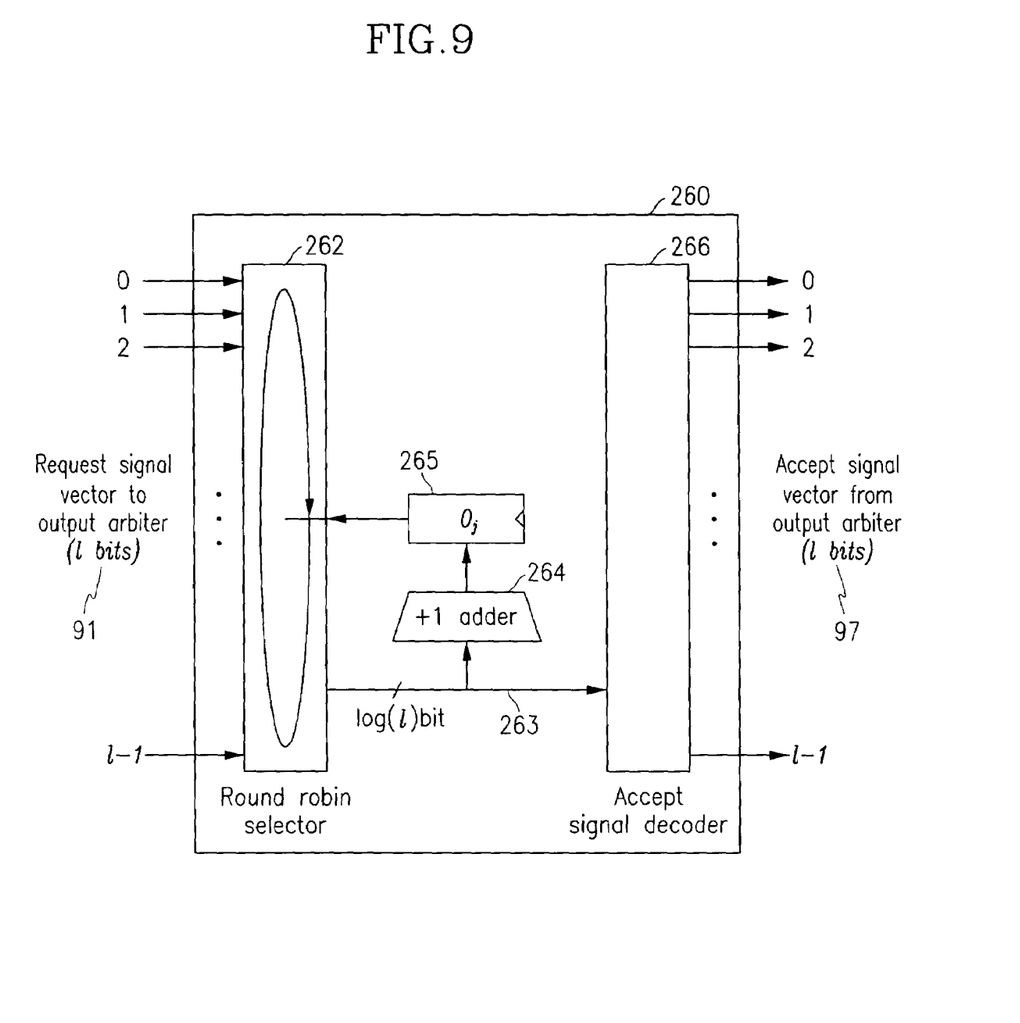
FIG. 9 shows an internal configuration of an output arbiter applicable to an output port according to a preferred embodiment of the present invention.

A detailed preferred embodiment on the second arbitration stage is illustrated in FIGS. 8 and 9, which will be described later.

Figure 3A:
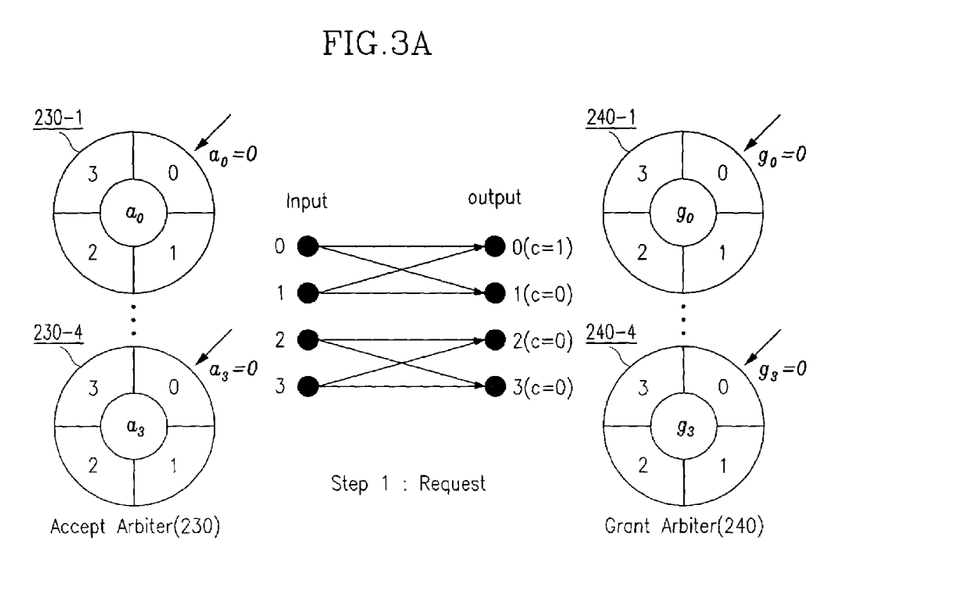
FIGS. 3(a) through 3(c) show an arbitration algorithm according to a preferred embodiment of the present invention.
Figure 3B:
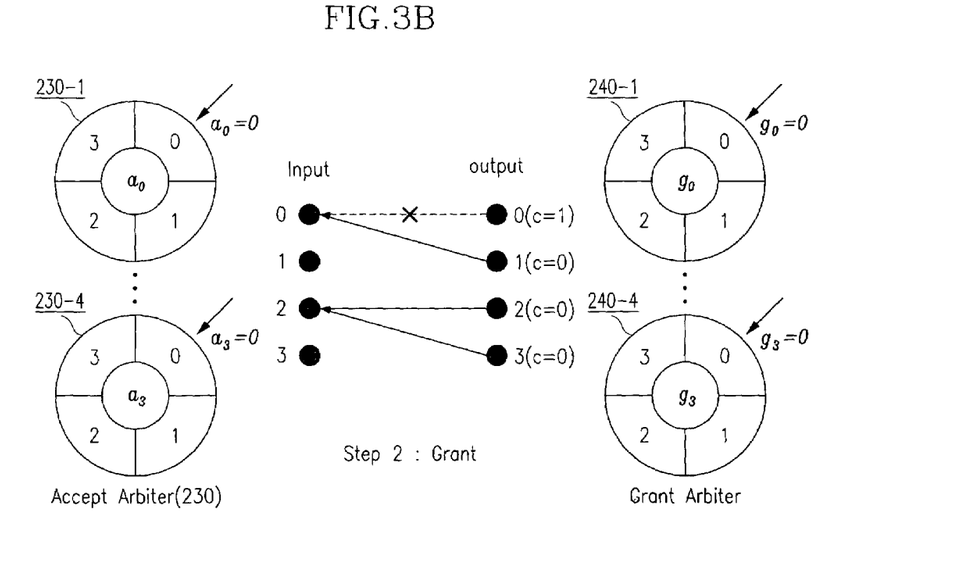
Figure 3C:
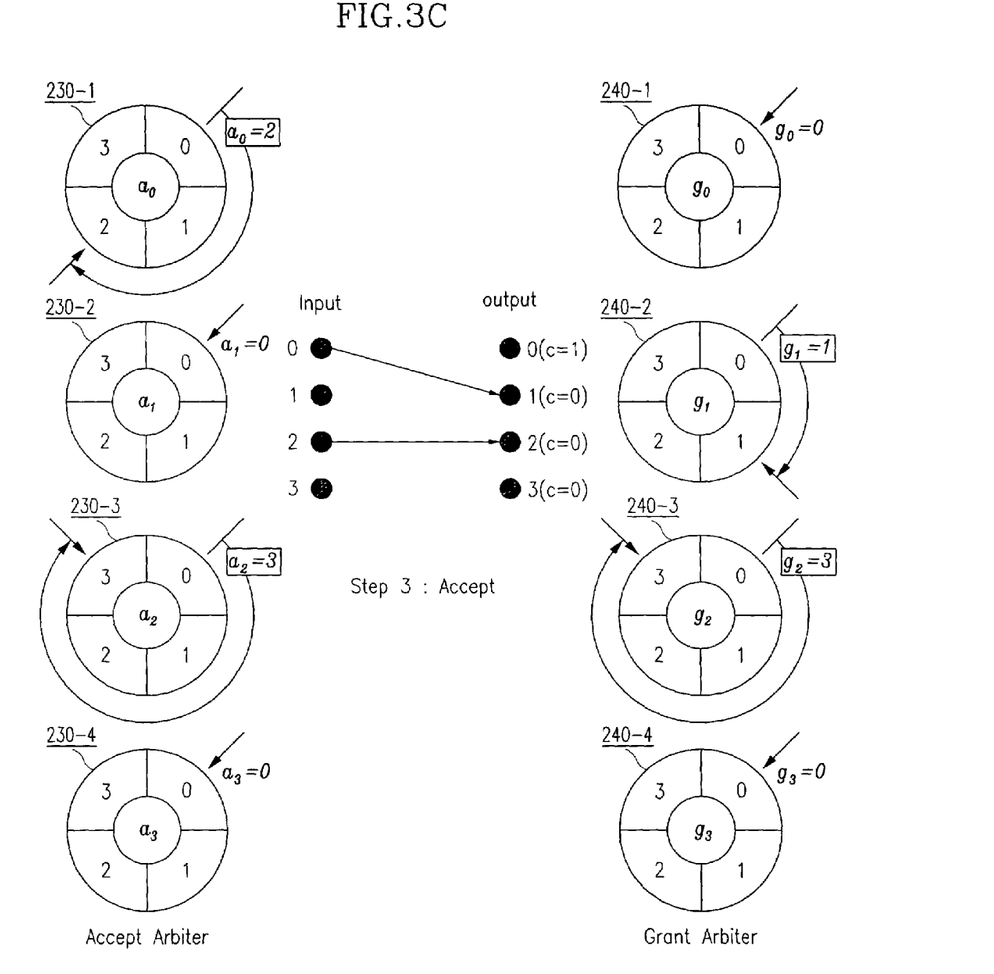

FIGS. 3(*a*) through 3(*c*) show an arbitration algorithm according to a preferred embodiment of the present invention.

FIG. 3(*a*) shows an exemplified case of generation of a request signal of the arbiter, which is applicable to the XSU 210.

In the preferred embodiment, a 4×4 XSU with four input ports and four output ports is given. Each input port has an accept arbiter 230-1 through 230-4, and each arbiter has an accept register $a_0$ through $a_3$ for storing the highest priority value for each port, and the current value of each register is assumed to be 0.

Also, a grant arbiter 240-1 through 240-4 for each output port has a grant register $g_0$ through $g_3$ for storing the highest priority value for each port, and the current value of each register is assumed to be 0.

A request signal is generated according to the state of the VOQ for each input port, and is transmitted to the corresponding output port. For example, at least one cell is provided in the VOQ matched with the output ports 0 and 1, and the input port 0 sends a request signal to the corresponding output port. Each output port of the XSU 210 has credit information that is state information of the SCB 212. In the preferred embodiment, the output port 0 has a credit value as 1, representing that the SDB can receive no cells (i.e., the SDB is full), and the credit value of other output ports is 0, representing that the SDB can receive at least one cell.

FIG. 3(*b*) shows an exemplified case of generation of a grant signal of the arbiter, which is applicable to the XSU 210.

Since the output port 0 has a credit value set as 1, it can receive no more cells, and does not transmit a grant signal to the input port. Since other cases of the output ports have the credit value set as 0, request signals are searched in the round robin format from the highest priority values stored in the grant arbiters 240-2 through 240-4 to select one of the request signals.

For example, since the grant arbiter 240-4 of the output port 3 has the highest priority value set as 0 and has received a request signal from the input port 2 and 3, it transmits a grant signal to the input port 2. Since the highest priority values of the grant arbiter 240-1 through 240-4 are updated after receiving an accept in the third accept stage, the values of the grant registers 240-1 through 240-4 maintain the same states of the first stage.

FIG. 3(*c*) shows an exemplified case of generation of an accept signal of the arbiter, which is applicable to the XSU 210.

On receiving grant signals from the grant arbiters 240-1 through 240-4, the input ports search for grant signals from the highest priority values stored in the accept arbiters 230-1 through 230-4 through the round robin format to select one of the grant signals.

Since the input port 0 has received a grant signal from the output port 1, the input port 0 transmits an accept signal to the corresponding port, the accept arbiter 230-1 of the input port 0 subsequently sets the highest priority value as 2, and the grant arbiter 240-2 of the output port 1 sets the highest priority value as 1.

That is, the input port 0 provides a priority to the output port 2, and the output port 1 assigns a priority to the input port 1 in the next time slot.

Since the input port 2 has the current highest priority value set as 0, and has received grant signals from the output ports 2 and 3, the input port 2 provides an accept signal to the output port 2, the accept arbiter 230-3 of the input port 2 subsequently sets the highest priority value as 3, and the grant arbiter 240-3 of the output port 2 sets the highest priority value as 3.

As shown in FIG. 3(*b*), since the grant arbiter 240-4 of the output port 3 has transmitted a grant signal to the input port 2, but has failed to receive an accept signal from the input port in the accept stage, the highest priority value of the grant arbiter 240-4 is maintained at 0.

Figure 4:
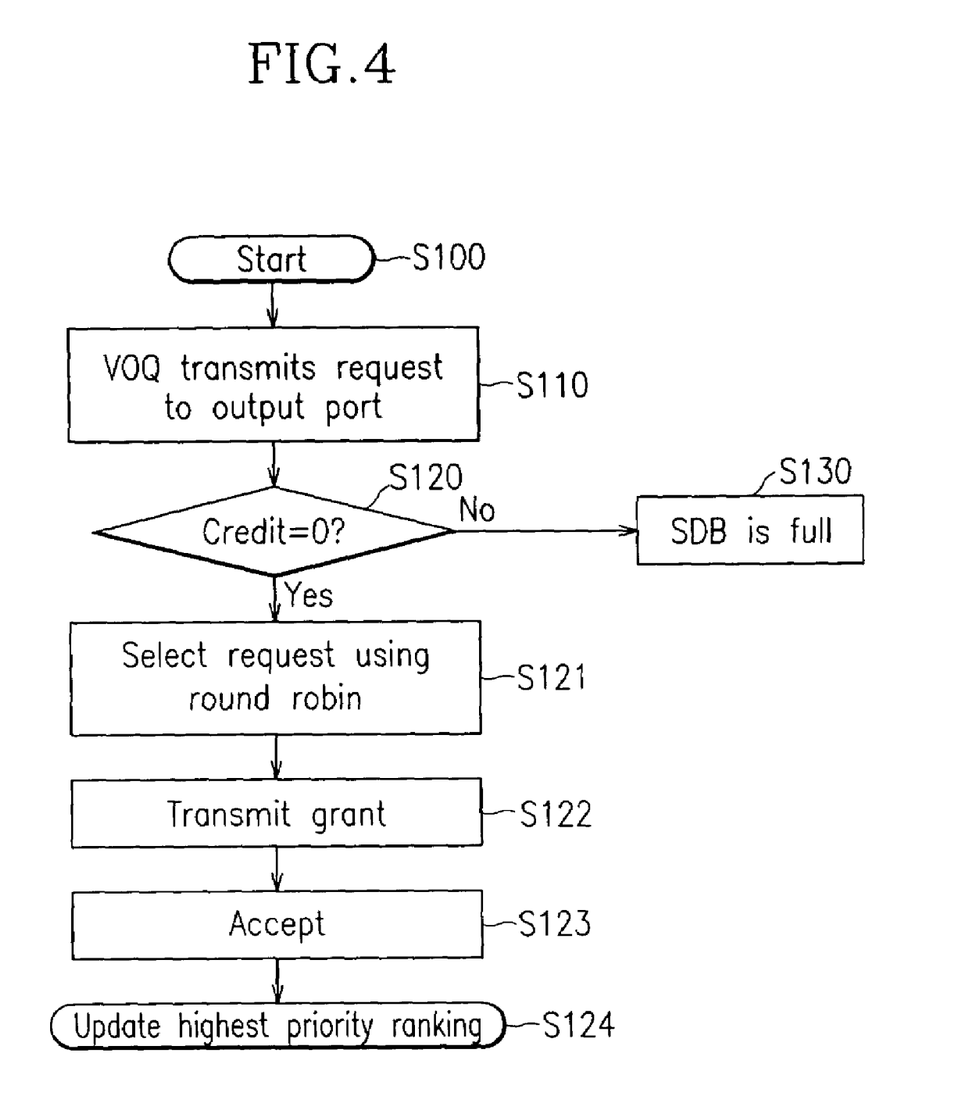
FIG. 4 shows a flowchart of a first arbitration step according to a preferred embodiment of the present invention.

FIG. 4 shows a flowchart of a first arbitration step according to a preferred embodiment of the present invention.

As described, when a VOQ that is not empty transmits a request signal to an output port in step S110, the output port checks an SDB value, and when the SDB is not 0 representing that the SDB is full, the request is denied in step S130. In this instance, the preference ranking from which the checking starts is maintained.

When the SDB value is 0, one of the requests is selected by the round robin from the highest priority ranking components in step S121, and a grant signal is sent to the input port in step S122. The input port searches for the grant signal to select a single grant signal and accept the grant signal in step S123, and accordingly, a new highest priority ranking component is selected and updated in step S124.

Figure 5:
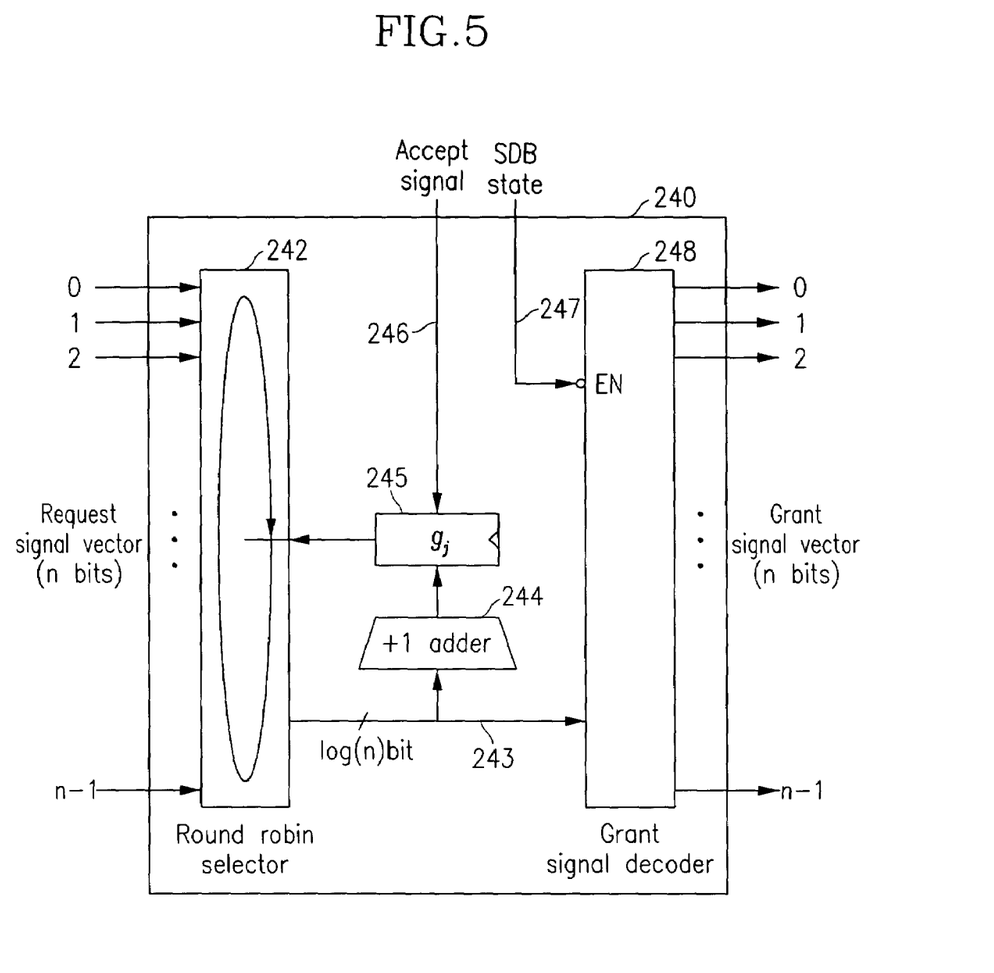
FIG. 5 shows a brief configuration diagram of a grant arbiter of an XSU 210 according to a preferred embodiment of the present invention.

FIG. 5 shows a brief configuration diagram of a grant arbiter of an XSU 210 according to a preferred embodiment of the present invention.

The grant arbiter 240 comprises a round robin selector 242, a grant arbiter register 245, an adder 244, and a grant signal decoder 248.

A request signal vector is transmitted to the grant arbiter 240 of the XSU 210. The request signal vector represents an n-bit request signal transmitted to a predetermined output port from an input port of the XSU 210.

The request signal vector is connected to the round robin selector 242. The round robin selector 242 searches for request signal vectors from the highest priority values stored in the grant arbiter register 245 using the round robin to select a single first-requested signal, and outputs a log(n)-sized signal 243 as a result of the selected request signal. The log(n)-sized signal 243 represents location information of the input port selected by the grant arbiter 240. The information increases by the adder by 1 in the modular n format, and then it is transmitted to the grant arbiter register 245. The value sent to the register 245 is stored therein when receiving an accept signal 246. Here, the accept signal 246 represents a signal for notifying that the grant signal generated by the grant arbiter 240 has been accepted.

The round robin selector 242 transmits a result signal 243 to the grant signal decoder 248. The grant signal decoder 248 generates an n-bit grant signal vector according to an SDB state signal 247.

The SDB state signal 247 shows states of the SDB 212 shown in FIG. 2, the state 0 showing that the SDB can receive a cell, and the state 1 showing that the SDB can receive no cells. The grant signal decoder 248 sets the grant signal vectors as 0 when the SDB state signal 247 is 1, and sets the bit selected by the round robin selector 242 as 1 and other bits as 0 when the SDB state signal 247 is 0, and outputs results, representing that the grant signal arbiter 240 selects one of n request signals and generates a grant signal according to priority when the SDB of the corresponding output port can receive a cell.

Figure 6:
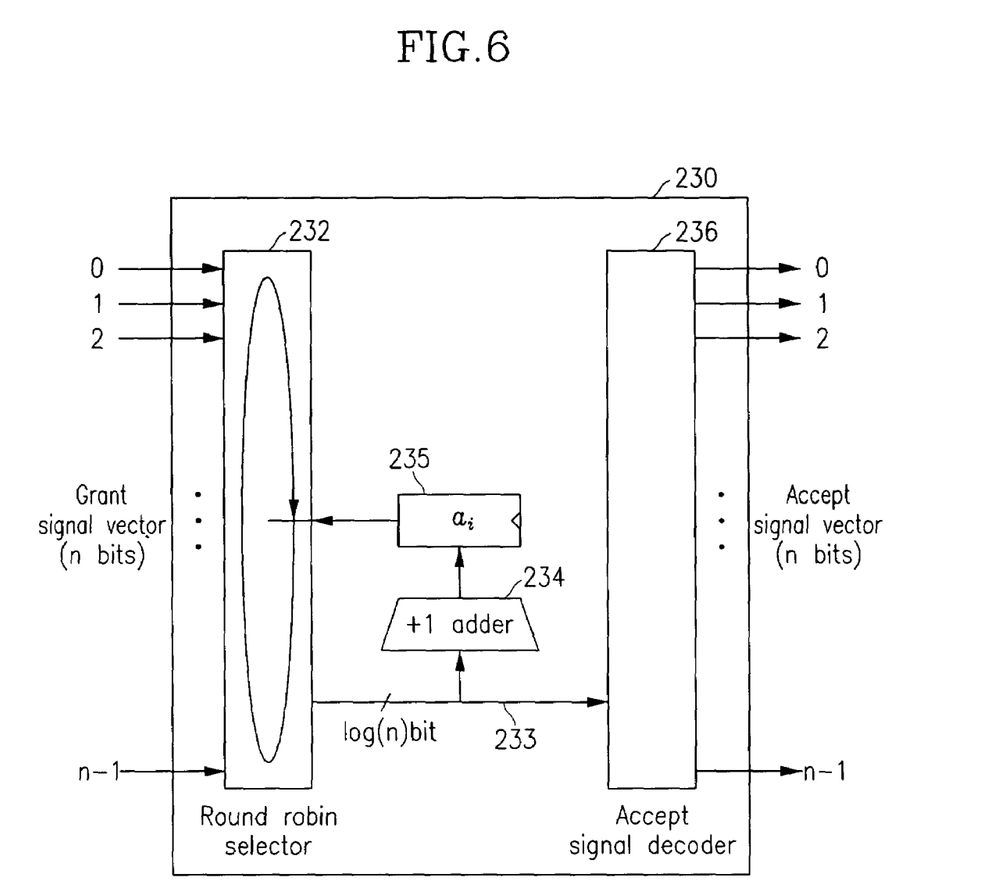
FIG. 6 shows a brief configuration diagram of an accept arbiter of an XSU 210 according to a preferred embodiment of the present invention.

FIG. 6 shows a brief configuration diagram of an accept arbiter 230 of an XSU 210 according to a preferred embodiment of the present invention.

The accept arbiter 230 comprises a round robin selector 232, an adder 234, an accept arbiter register 235, and an accept signal decoder 236.

First, an n-bit grant signal vector is transmitted to the accept arbiter 230 of the XSU 210. The grant signal vector represents an n-bit grant signal transmitted to a predetermined input port from an output port of the XSU 210.

The grant signal vector is connected to the round robin selector 232. The round robin selector 232 searches for grant signal vectors from the highest priority values stored in the arbiter register 235 using the round robin to select a single first-granted signal, and outputs a log(n)-sized signal 233 as a result of the selected grant signal. The log(n)-sized signal 233 represents location information of the output port selected by the accept arbiter 230. The information increases by the adder 234 by 1 in the modular n format, and then it is stored in the register 235.

The round robin selector 232 transmits a result signal 233 to the accept signal decoder 236. The accept signal decoder 236 sets the bit corresponding to the log(n)-sized result signal as 1, and other bits as 0 to generate an n-bit accept signal vector.

Figure 7:
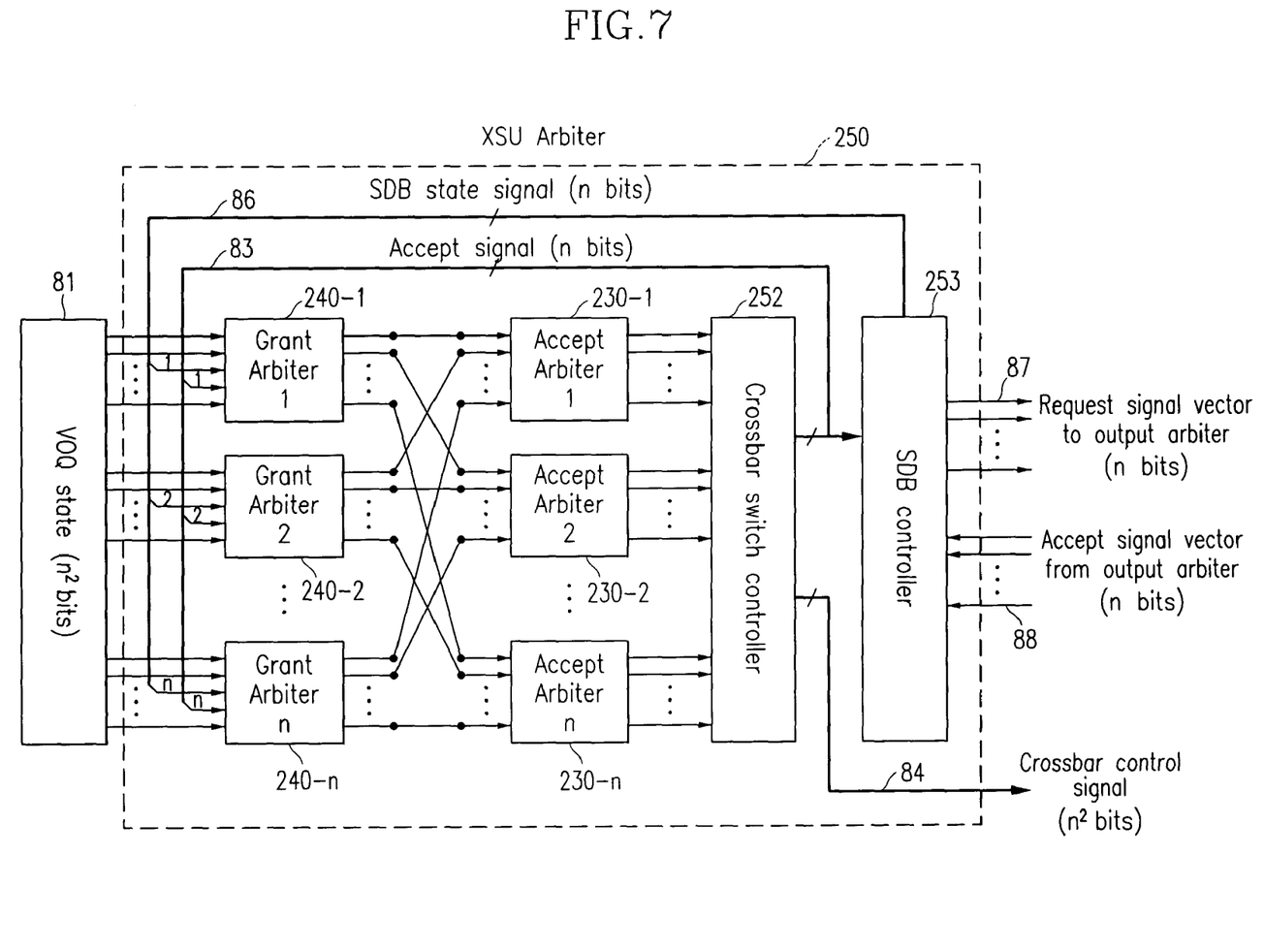
FIG. 7 shows a brief diagram of a realized XSU arbiter applied to the XSU 210 according to a preferred embodiment of the present invention.

FIG. 7 shows a brief diagram of a realized XSU arbiter applied to the XSU 210 according to a preferred embodiment of the present invention.

The XSU arbiter 250 comprises an $n^2$-bit VOQ state 81, n distributed grant arbiters 240-1 through 240-n, n distributed accept arbiters 230-1 through 230-n; a crossbar switch controller 252, and an SDB controller 253.

The $n^2$-bit VOQ state 81 represents the current states of n VOQs for respective n input ports connected to the XSU 210, and it is 1 when non-empty, and it is 0 when empty.

The grant arbiter 240-1 through 240-n receives n-bit information matched with the request signal vector shown in FIG. 5 from the VOQ state 81, generates an n-bit signal matched with the grant signal vector of FIG. 5, and transmits the n-bit signal to the accept arbiter 230-1 through 230-n.

The accept arbiter 230-1 through 230-n receives n-bit information matched with the grant signal vector shown in FIG. 6, generates an n-bit signal matched with the accept signal vector shown in FIG. 6, and transmits the n-bit signal to the crossbar switch controller 252.

The crossbar switch controller 252 checks the acceptance states of the respective output ports to generate an n-bit accept signal 83 and generates an $n^2$-bit crossbar control signal 84 for controlling respective cross points of the n×n crossbar switch.

The crossbar switch controller 252 checks the acceptance states per output port from the accept signals transmitted from the accept arbiters 230-1 through 230-n, and sets the bit corresponding to the accept signal 83 as 1.

The SDB controller 253 checks the state of the SDB, and generates an SDB state signal 86 as 0 when the SDB can store a cell, and an SDB state signal as 1 when it can store no cells. The SDB controller 253 generates a request signal vector 87 and transmits the same to the output arbiter when the SDB has at least one cell. The accept signal vector 88 from the output arbiter is a result signal of the output arbiter as to the request signal vector 87 to the output arbiter. By using the result signal, the SDB controller 253 can distinguish the SDB from which one cell can come out in the next time slot.

The SDB controller 253 can distinguish the SDB in which a single cell will be stored in the next time slot from the accept signal 83, and further, it can check the state of the SDB by using the accept signal vector 88 from the output arbiter.

FIG. 8 shows a flowchart of a second arbitration step according to a preferred embodiment of the present invention.

Since the second arbitration stage is exclusively executed by only one output port, no grant on the request is required, and the second arbitration stage includes request and accept operations.

Therefore, the output arbiter receives a request signal from the XSU arbiter in step S210, and searches the request signal from the highest priority ranking in the round robin method in step S220. By selecting the signal searched in the round robin in step S230, the selected signal is accepted. When accepting the request signal, the highest priority ranking component of the XSU is updated at the output arbiter in step S240.

The configuration of the output arbiter will now be described in detail.

FIG. 9 shows an internal configuration of an output arbiter applicable to an output port according to a preferred embodiment of the present invention.

The output arbiter 260 comprises a round robin selector 262, an adder 264, a register 265, and an accept signal decoder 266.

A request signal vector 91 is transmitted to the output arbiter 260. The L-bit request signal vector 91 represents a request signal transmitted to the output arbiter 260 from L XSUs. The request signal vector 91 is connected to the round robin selector 262. The round robin selector 262 searches for the request signal vector 91 from the highest priority values stored in the register 265 using the round robin method to select a first-requested single signal.

The round robin selector 262 outputs a log(L)-sized signal 263 as a result of the selected request signal. The log(L)-sized signal represents location information of the XSU selected from the output arbiter 260. The information increases by the adder 264 by 1 in the modular L format, and it is then stored in the register 265.

The round robin selector 262 transmits a result signal to the accept signal decoder 266. The accept signal decoder 266 sets the bit matched with the result signal of the log(L) size as 1, and other bits as 0, and generates an L-bit-sized accept signal vector 97.

Figure 10:
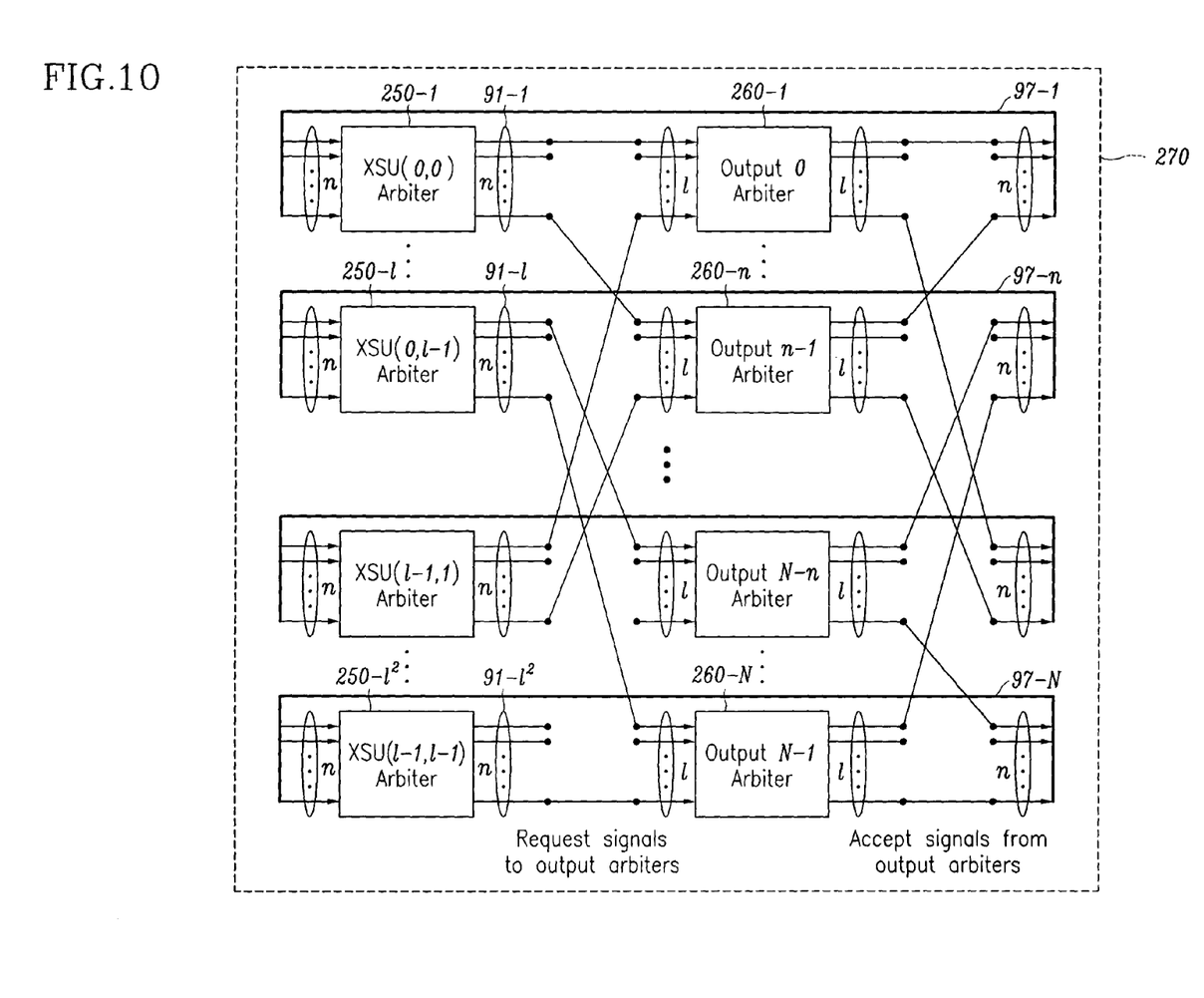
FIG. 10 shows a brief configuration diagram of an arbiter on the applicable N×N matrix switch according to a preferred embodiment of the present invention.

FIG. 10 shows a brief configuration diagram of an arbiter on the applicable N×N matrix switch according to a preferred embodiment of the present invention.

The arbiter 270 on the N×N matrix switch is formed by connecting $L^2$ distributed XSU arbiters 250-1 through 250-$L^2$ to N distributed output arbiters 260-1 through 260-N. Request signals 91-1 through 91-$L^2$ output from the respective XSU arbiters are transmitted to the output arbiters, and accept signals 97-1 through 97-N output from the respective output arbiters are transmitted to the XSU arbiters.

Arbitration on the N×N switch following the above-noted configuration is formed by connecting the $L^2$ distributed XSU arbiters and the N distributed output arbiters. Also, since a single XSU includes n distributed grant arbiters and n distributed accept arbiters, the present invention achieves excellent scalability. Further, all the arbitration methods are realized on the basis of the round robin most suitable for high-speed realization. Therefore, the present invention connects small crossbar switch units to configure a large switch, and provides high expandability and distributed arbitration required for high-speed and large-capacity switches.

When performing a simulation on the uniform traffic with a single iteration in a time slot, the present invention has a cell transfer delay time performance that is relatively excellent in comparison with other methods such as the PIM and the iSLIP methods under the same condition, and obtain 100% throughput for uniform traffic, thereby providing relatively excellent arbitration time margins compared to other methods.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A matrix switch comprising:
an input port for splitting a plurality of virtual output queues (VOQs) into a plurality of VOQ groups;
a plurality of crossbar switch units for independently arbitrating the input VOQ groups, and outputting cells, wherein each crossbar switch unit includes a buffer storing a predetermined sized cell and includes a grant arbiter that outputs a log(n) sized signal based on a selected request signal, the log(n) sized signal representing location information of a selected input port for generating a grant signal;
a plurality of buffers for storing a predetermined sized cell; and
a plurality of output ports for independently arbitrating the cells output from the crossbar switch units, and transmitting the cells to the output ports,
wherein each output port uses credit information that is status information of the corresponding buffer to independently arbitrate the cells,
wherein a first output port which has a first credit value with full state of buffer does not transmit the grant signal to a first input port which sends a request signal to the first output port, and
a second output port which has a second credit value with no full state of buffer selects one among second input ports, which sent a request signal to the second output port, and the second output port transmits the grant signal to one selected second input port.

2. The matrix switch of claim 1, wherein part of the crossbar switch units form a plurality of switch modules, and
the switch module further comprises a buffer for storing a predetermined cell in the output port of the crossbar switch unit.

3. The matrix switch of claim 1, wherein n VOQs are separated into L VOQ groups when N VOQs are provided,
the switch module comprises L crossbar switch units,
the matrix switch comprises L switch modules, and L=N/n where N, L, and n are natural numbers.

4. The matrix switch of claim 3, wherein the crossbar switch unit comprises n distributed grant arbiters, n distributed accept arbiters, and a crossbar switch controller,
the grant arbiter receives an n-bit request signal vector from the VOQ, and transmits an n-bit grant signal vector to the accept arbiter, and
the accept arbiter receives the n-bit grant signal vector, and transmits an n-bit accept signal vector to the crossbar switch controller.

5. The matrix switch of claim 4, wherein the matrix switch further comprises a buffer controller and an output arbiter,
the buffer controller checks the buffer's state, and transmits request signals to the output arbiter when a cell is provided in the buffer, and
the output arbiter selects one of the transmitted request signals, and transmits an accept to the crossbar switch unit.

6. An arbitration method of a matrix switch including a plurality of input ports, a plurality of crossbar switch units, a buffer, and a plurality of output ports, comprising:
(a) a grant arbiter of the crossbar switch unit searching for request signals transmitted from a plurality of Virtual Output Queue (VOQ) groups of the input ports, and selecting tile first-requested input port of one of the plurality of VOQ groups, the grant arbiter outputting a log(n) sized signal based on a selected request signal, the log(n) sized signal representing location information of the selected first-requested input port for generating a grant signal;
(b) determining whether a buffer of the output port corresponding to tile grant arbiter can receive an additional cell, wherein the destination is based on credit information that is status information of the buffer of the output port;
(c) transmitting the grant signal to the input port of one of the plurality of VOQ groups when the buffer can receive the cell;
(d) an accept arbiter of the crossbar switch unit selecting the first-granted grant signal of tile grant signals; and
(e) the accept arbiter transmitting an accept signal to the output port corresponding to the selected grant signal,
wherein in step (c), a first output port which sends a first credit value with full state of buffer does not transmit a grant signal to a first input port which sends a request signal to the first output port, and a second output port which has a second credit value with no full state of buffer selects one among second input ports which send a request signal to the second output port and transmits the grant signal to one selected second input port.

7. The arbitration method of claim 6, further comprising:
(f) an output arbiter of the output port searching for the request signals transmitted from the crossbar switch unit to select the first-requested crossbar switch unit; and (g) the output arbiter transmitting an accept signal to the selected crossbar switch unit.

8. The arbitration method of claim 6, wherein the searching is performed from the predefined highest priority value using the round robin in (a), (d), and (f).

9. The arbitration method of claim 8, wherein (c) further comprises updating the new highest priority value based on port information of the selected output port, and storing the value in a register, when the accept arbiter has received a grant signal; and (h) further comprises updating the highest priority value based on information on the corresponding crossbar switch unit, and storing the value in the register, when the output arbiter has transmitted the accept signal to the crossbar switch unit.

10. The arbitration method of claim 9, wherein the accept arbiter updates the preset highest priority ranking value by adding 1 to output port information matched with a grant signal, and the accept arbiter updates the highest priority ranking value preset to the grant arbiter and the output arbiter by adding 1 to input port information and crossbar switch unit information corresponding to the accept signal.

* * * * *